May 20, 1924.
A. HUGUENIN
TIDAL WATER POWER PLANT
Filed June 8, 1923   2 Sheets-Sheet 1
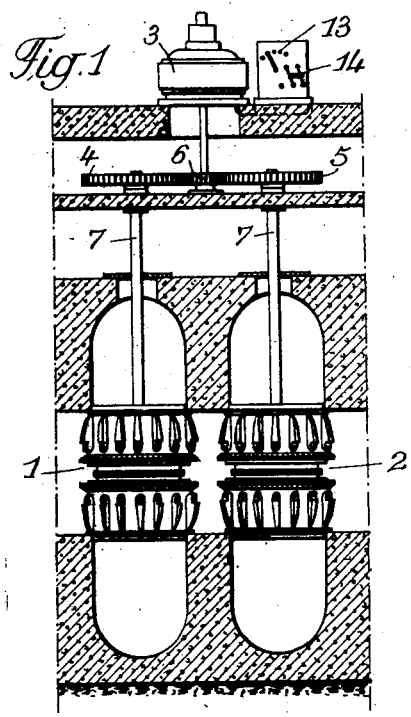
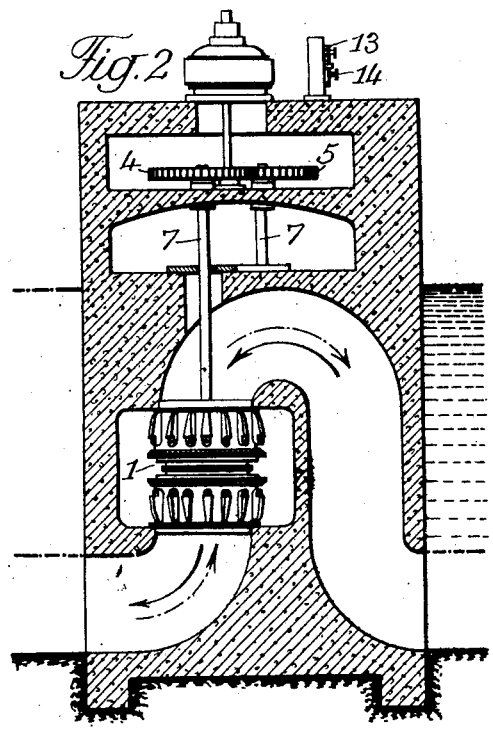
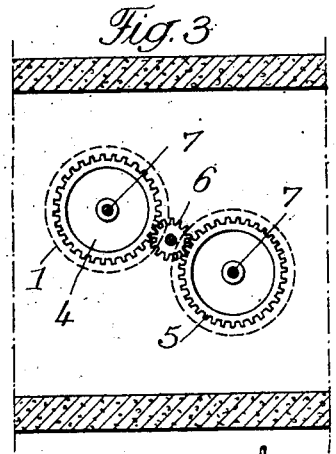
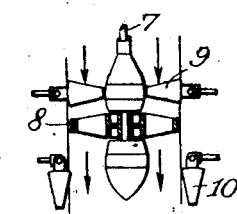
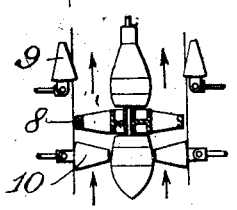
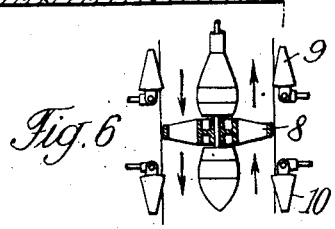
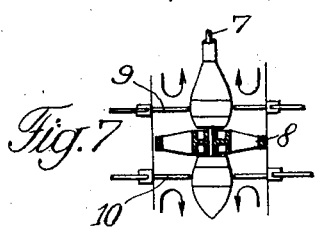
Inventor:
Albert Huguenin May 20, 1924. 1,494,842
A. HUGUENIN
TIDAL WATER POWER PLANT
Filed June 8, 1923  2 Sheets-Sheet 2

Inventor:
Albert Huguenin
by Henry Orth
Atty

Patented May 20, 1924.

1,494,842

UNITED STATES PATENT OFFICE.

ALBERT HUGUENIN, OF ZURICH, SWITZERLAND.

TIDAL WATER-POWER PLANT.

Application filed June 8, 1923. Serial No. 644,191.

*To all whom it may concern:*

Be it known that I, ALBERT HUGUENIN, a citizen of the Republic of Switzerland, residing at Zurich, Switzerland, have invented certain new and useful Improvements in Tidal Water-Power Plants, of which the following is a specification, reference being had therein to the accompanying drawing.

In my Letters Patent No. 1,448,627, dated March 13, 1923, there is disclosed a method of working a tidal water power plant in which the electric current generating machine of each aggregate composed of at least one turbine and of an electric generator consists of an asynchronous generator. For the purpose of generating a current of constant voltage and periodicity, the variation in the speed of the turbine occasioned by a variation in the water head is counteracted by an alteration in the electrical connection of the asynchronous generator, while at the same time at least one synchronous condenser is made use of for the avoidance of undesirable low power factors and at least one independently driven synchronous generator is employed for determining the periodicity, the synchronous condenser may be dispensed with in case asynchronous-synchronous generators are utilized as the electrical part of the aggregates. After a definite minimum head of water has been reached first of all those members of the turbine which actually impede the flow of the water are removed from the supply passage and the aggregate is then set to work as a motor-pump so as to effect a speedy readjustment of the water-level difference, after which the water passages between the dam and the turbine are closed by said members of the turbine.

It has now been found that the electrical conditions will be simplified if, according to the present invention, instead of an asynchronous generator a continuous current machine is used as the part of the aggregate which generates the current. In this case the variation in the speed of the turbine is counteracted by an alteration of the electrical conditions of the continuous current machine, preferably by an alteration of the excitation.

A constructional example of the tidal water-power plant according to the present invention is illustrated on the accompanying drawings, in which:

Fig. 1 is a vertical section taken longitudinally through the dam through an aggregate of the system, and Fig. 2 is a vertical section taken transversely to the dam through an aggregate.

Fig. 3 is a plan of Fig. 1.

Fig. 4 shows diagrammatically the position of the guide apparatus for one direction of rotation of the turbine when working.

Fig. 5 shows the guide apparatus in the position occupied when the turbine is rotating in the other direction.

Fig. 6 represents both apparatus out of action for the purpose of securing a free through passage for the water and Fig. 7 shows both apparatus in closed position to effect a water-tight obturation of the turbine channels.

Figure 8:
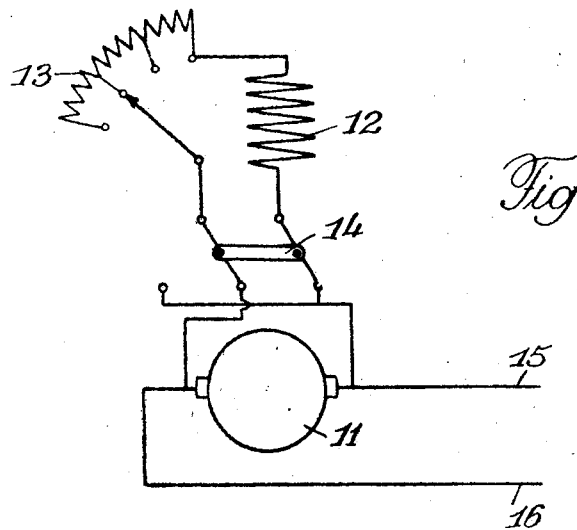
Figs. 8 and 9 show diagrammatically the means for altering the excitation of a continuous current machine.

In the drawings, 1 and 2 denote two turbines which act on a common continuous current generator 3 by means of the spur gear 4, 5 and 6. The turbines themselves are of the axial flow type and are provided with one upper and one lower guide apparatus, the rotary blades 9 and 10 of which pivoting round horizontal axes permit of an exact regulation of the load of the turbines. In the one direction of flow only one of the guide apparatus is operative, for example the upper one 9 (Fig. 4) with the direction of flow downwards and the lower one 10 (Fig. 5) with flow upwards. The blades of the inoperative apparatus are, by means of a suitable contrivance which is shown in detail in the aforementioned patent, turned out of the passages of the axial turbines and take up the temporary position represented in the drawing.

When it is desired to completely open the water passages then the blades 9 and 10 of both guide apparatus are rotated out of the passage, as illustrated in Fig. 6, and there remains only the turbine rotor wheel, which as indicated above may be made use of as an axial pump. If, lastly, it be desired to close the passage completely then both guide apparatus are swung round into their operative position and then both closed (Fig. 7) whereby a perfectly water-tight obturation of the passage in question results.

The operation of the tidal-water-power-plant is as follows the assumption being made that the minimum head at which the turbine has to work averages about 1 metre.

Figure 9:
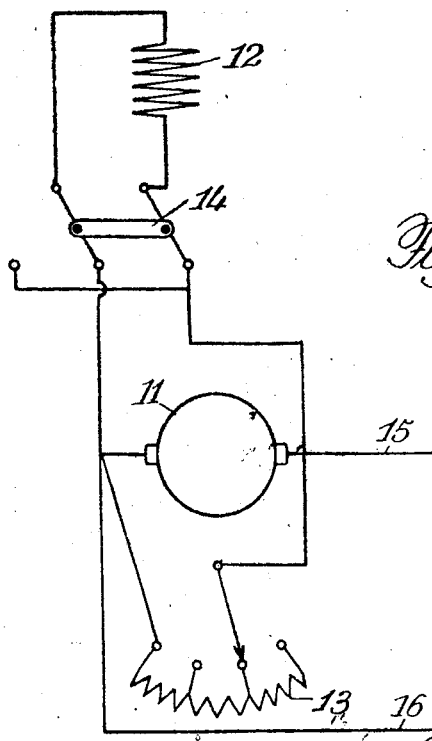

Turbines and generators run in one direction with a somewhat high revolution number depending on the rather large head. This head diminishes slowly so that the turbine has to be dropped to a lower speed, the voltage of the current generated being maintained constant by altering the excitation by means of a field resistance as is diagrammatically illustrated in Fig. 8. In this figure 11 denotes the continuous current machine having a field-winding 12, a regulating resistance 13 being inserted in the field circuit as well as a pole change switch 14. 15 and 16 are the mains. The regulating resistance 13 may also be arranged as is shown in Fig. 9.

When the head measures only about one metre the pole change switch 14 is operated whereupon the aggregate runs as motor and pump for effecting a speedy equalization of the water levels, the guide apparatus that is operative being put out of action during this period. As soon as the two water levels on opposite sides of the dam are adjusted or, in practice, shortly before then the guide apparatus are both closed (Fig. 7) and the motor is now driving the turbine wheel idly between two closed walls and may during the interval be reversed so as to rotate in the other direction. As soon as about 1 metre of head is available the inlet guide-apparatus is opened and the aggregate runs as a turbine generator. As the head and the speed of the aggregate increase the voltage generated is kept constant by means of the regulating resistance.

I claim:

In a tidal-water-power-plant, in combination, at least one aggregate composed of a continuous current generator and a turbine, means adapted to alter the excitation of the continuous current machine for compensating the variation of speed occasioned by the variation in the available head of water, a change pole switch inserted in the field circuit of said continuous current machine, two controllable guide apparatus for said turbine, means to render one of same operative when the turbine works in the one of the two rotary directions and to render the other inoperative by removing it from the supply passages to the turbine and to remove both guide apparatus for giving a perfectly free passage to the water through the turbine channel.

In testimony whereof I affix my signature.

ALBERT HUGUENIN.